United States Patent
Olsson

(10) Patent No.: US 10,675,722 B2
(45) Date of Patent: Jun. 9, 2020

(54) METHOD AND DEVICE FOR CENTERING AND TEMPORARY FIXATION OF TUBE PARTS

(71) Applicant: KJELL-ÅKE OLSSON FÖRVALTNINGS AB, Lysekil (SE)

(72) Inventor: Kjell-Åke Olsson, Lysekil (SE)

(73) Assignee: KJELL-ÅKE OLSSON FÖRVALTNINGS AB, Lysekil (SE)

( * ) Notice: Subject to any disclaimer, the term of this patent is extended or adjusted under 35 U.S.C. 154(b) by 369 days.

(21) Appl. No.: 15/512,167

(22) PCT Filed: Aug. 10, 2015

(86) PCT No.: PCT/SE2015/050863
§ 371 (c)(1),
(2) Date: Mar. 17, 2017

(87) PCT Pub. No.: WO2016/056972
PCT Pub. Date: Apr. 14, 2016

(65) Prior Publication Data
US 2017/0282309 A1    Oct. 5, 2017

(30) Foreign Application Priority Data
Oct. 8, 2014 (SE) ...................................... 1451201

(51) Int. Cl.
*B23K 37/00* (2006.01)
*B23K 37/053* (2006.01)
(Continued)

(52) U.S. Cl.
CPC ...... *B23K 37/0533* (2013.01); *B23K 37/0531* (2013.01); *F16B 2/065* (2013.01);
(Continued)

(58) Field of Classification Search
CPC .................................................. B23K 37/0531
(Continued)

(56) References Cited

U.S. PATENT DOCUMENTS 2,615,413 A * 10/1952 Adams ............... B23K 37/0531
269/34
3,283,115 A * 11/1966 Nelson ............... B23K 37/0531
219/60 R
(Continued)

FOREIGN PATENT DOCUMENTS

| RU | 14725 U1 | 8/2000 |
| RU | 2302933 C1 | 7/2007 |
| RU | 2407618 C2 | 12/2010 |

OTHER PUBLICATIONS

International Search Report Corresponding to PCT/SE2015/050863 dated Jan. 21, 2016.
(Continued)

*Primary Examiner* — Erin B Saad
(74) *Attorney, Agent, or Firm* — Davis & Bujold PLLC; Michael J. Bujold

(57) ABSTRACT

Method and device for centering and temporary fixation of tube parts (1, 5) in relation to each other's interior surfaces. A first tool (9) is centered relative to a tube part interior surface (2, 6) by a radially adjustable centering mechanism (13). The centering mechanism (13) is insertable in the tube part (1, 5). A second tool (10) is centered relative to the first tool (9), by a guiding mechanism (15) which cooperates for centering of the tools (9, 10) relative to one another. The second tool comprises fixing mechanism (17) to fix the exterior surface of the tube part (1, 5) to the second tool (10), and at least one third guide (18) which centers two such second tools (10) relative to one another in their mounted
(Continued)

Figures 1A, 1B:
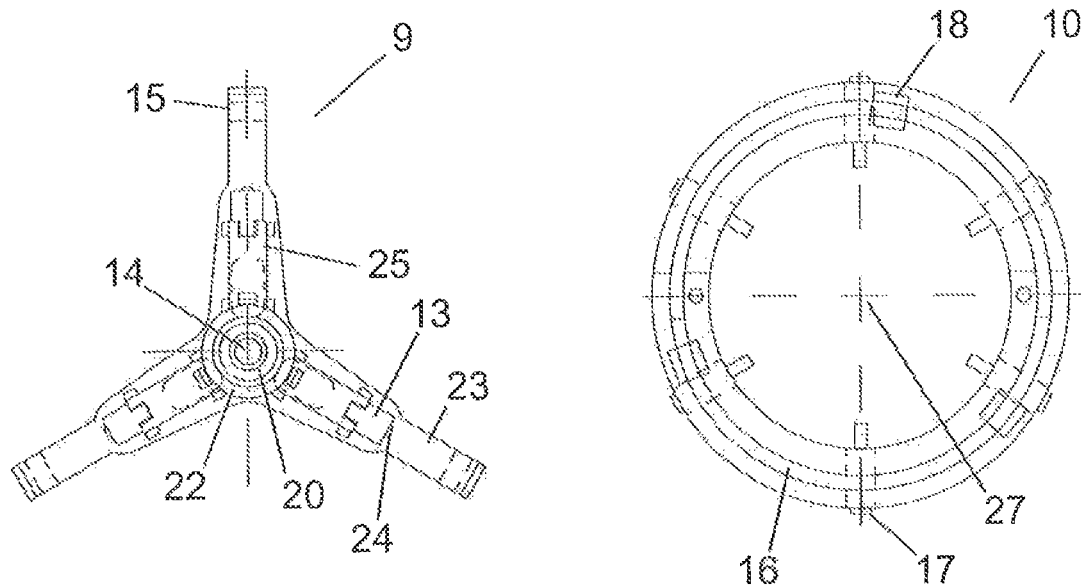

position on respective tube part end (4, 8) and at least one coupling member (19) to connect the two second tools (10).

<div align="center">12 Claims, 2 Drawing Sheets</div>

(51) Int. Cl.
    *F16B 2/06*      (2006.01)
    *F16B 7/18*      (2006.01)
    *B23K 101/06*    (2006.01)
    *B23K 101/10*    (2006.01)

(52) U.S. Cl.
    CPC .......... *F16B 7/182* (2013.01); *B23K 2101/06* (2018.08); *B23K 2101/10* (2018.08)

(58) Field of Classification Search
    USPC ................... 228/44.5, 49.3, 48.1; 269/52, 43
    See application file for complete search history.

(56) References Cited

<div align="center">U.S. PATENT DOCUMENTS</div>

| | | | |
|---|---|---|---|
| 3,330,021 A | * | 7/1967 | Helmuth ............ B23K 37/0531 29/261 |
| 4,496,093 A | | 1/1985 | Taylor, Jr. |

<div align="center">OTHER PUBLICATIONS</div>

Written Opinion Corresponding to PCT/SE2015/050863 dated Jan. 21, 2016.
Russian Search Report issued in corresponding Russian Patent Application No. 2017110696/02(018831) dated Nov. 25, 2018.

* cited by examiner

METHOD AND DEVICE FOR CENTERING AND TEMPORARY FIXATION OF TUBE PARTS

TECHNICAL FIELD

The present invention relates to a method and a device to center and then temporary fix two tubes or fittings relative to each other, to provide as good conditions as possible to a achieve perfect weld seam.

TECHNICAL BACKGROUND

Mainly in refinery and petrochemical industry the need for experienced plumbers and skilled welders is great. The requirements of the tubing and any welded joints within this type of industry are of obvious reasons very high, and to provide high quality weld seams and an efficient workflow of welding operations is currently in normal cases, a small group consisting of one experienced plumber and 2-3 experienced welders working together. A tube fitter rigs tubes and fittings, which are to be welded together, and the tube fitter employs 2-3 welders which welds the rigged tube parts together. The rigging is currently made usually with tube fixtures which are mounted on the tube or fitting by gripping the tube/fitting from the outside in three or more points. In the fixed position then both the rough and fine adjustment can be performed, to center one tube relative to another tube, provided with a tube fixture. The fixture thus grip from the outside and the adjustment is made from the outside, but it is the inside that is most important in terms of centering, because no or minimal interior edge misalignment may occur between the tube parts to obtain a good and safe welding, according to current standards. Therefore the centering is checked visually from the inside, often with help from a flashlight, and the need of adjustment is determined, whereafter fine-tuning is performed with adjustment screws at the tube fixture. This is therefore a method built on that the tube fitter possesses great experience, feel and accuracy. To mention in connection to this is that for example tube bends have slightly different wall thickness—thicker material in the inner radius and thinner material in the outer radius. Also details as T-couplings, but also the tube itself may have different wall thickness. While it is very important for the quality of the weld that it is the inside that has as little edge misalignment as possible, relative to next tube part, which should be welded to the actual tube part, the method of internal visual inspection of the joint together with the external adjustment constitutes a blunt and uncertain method, basically completely built on the experience of the tube fitter. The method is also time-consuming and the tube fitter cannot employ more than 2-3 welders with this method. Another difficulty is that for example connecting tube fittings, as flanges, T-couplings and tube bends, which shall be welded with a certain angle in relation to the first tube part, for the further route of the tubing. With today's equipment it is often hard to arrange the rigging with the exact angle and at the same time a perfect centered joint, also having the correct distance between the tube parts before the forthcoming welding. Thus, it is almost impossible to use internal visual inspection of the joint while it is a number of bends or T-couplings and similar that will be welded together. Similar problems are also at hand for long tubes. But there is an advantage with this kind of external tube fixture by that no interior tools needs to be removed before or after the welding operation.

Tools have been developed in order to take into account that it is the inside of the tube or fitting that is most important to center relative to the connecting tube. In U.S. Pat. No. 3,283,115 an interior clamp element is used for centering the insides such that a welding device can be used and U.S. Pat. No. 4,496,093 is showing a device for centering tube parts to each other with an interior clamp, which clamp arms expands outwardly to center the tube through a number of operations. Thus, both solutions are difficult to apply on longer tube parts or at bends and the like because they are positioned inside the tubes and somehow needs to be taken out from the tube parts. Further, it is very time-consuming to, as for example in U.S. Pat. No. 4,496,093, perform a number of measurements to decide the inner diameter in respective tube part, adjust two of the clamp arms (29) to the exact radius value, and further compensate for eventual differences in the interior diameter with setting screws (37, 38), and after this insert the tool in the joint and expand a third arm (21) for centering of the tool. A simplified and quicker method is needed.

DISCLOSURE OF THE INVENTION

With the present invention the object is achieved to solve the above mentioned problems and bringing technology forward within the field through a method and a device for centering and thereafter temporary fixing of tube parts relative to each other.

From a first aspect of the invention the object is achieved by a method of the initially specified kind according to which two tube parts are centered relative to each other based on the inside of the respective tube. Throughout is tube part used as a collective term for tubes, tube bends, so-called T-couplings, Y-couplings and similar tube parts, which are common at pipe systems. According to the method a first tool is arranged at a first tube part end and is centered relative to the interior surface of the first tube part. A second tool, which preferably is temporary arranged in connection to the exterior surface of the first tube part, is after this centered relative to the first tool. Through this the second tool will also be centered relative to the inside of the first tube part. In this position is the outside of the first tube part fixed to the second tool, whereby the first tool is removed, to not obstruct or be left inside the tube part, which is a problem in prior art solutions. Another reason to remove the first tool is to be able to use the same first tool to repeat the above described procedure for the second tube part. When the same operation is performed also for the second tube part is thus a second tool applied at the second tube part and fixed at its outside, and thereby is also that tool centered relative to the interior surface of the second tube part. The next step is to bring together and center the two tube parts with their respective second tools. Further the tools are connected to fix the two tools axially in relation to each other in the centered position and at a predetermined distance from each other so that the respective tube end is positioned at an approximately slightly greater distance from each other than the distance desired for the given weld. Normally seen, the distance between the tube ends, the so called welding gap, for welds within this field, can be from completely closed up to several millimeters. By the above described method, a quick, simple and safe method for centering and fixing of tube parts in relation to each other with respect of their interior surfaces without remaining interior tools is achieved, and instead safely centered exterior tools, which safely are centered and fixed in relation to each other, is obtained and varying material thickness is better and quicker compensated by the invented method. This is not possible with prior art solutions.

According to a preferred embodiment of the method it is allowed that both second tools, with their respective tube parts, are rotated relative to each other around a common center axis, in the centered and connected position. This makes it very easy to set a rotation angle, for example, for a bend in relation to the rest of the tubing. When the coupling of the other two tools is made as described above, the parts are simply rotated until the desired angle is obtained, and all the time with the tube parts connected to each other. Older solutions with external fixtures have great difficulty both to hold the tube parts together, with the desired weld gap, while the tube parts should be turned in to the desired angle, and it is time-consuming with repeated control measurements to ensure that alignment, gap and angle is withheld for the forthcoming fixation of the tube parts in correct position to each other before the welding operation.

In a further preferred embodiment, spacers are placed in the so-called welding gap, present between the tube ends, by that the two second tools in the centered and connected position are axially fixed at a predetermined distance from each other. The spacers are selected depending on the requirements of the weld, and may vary in thickness from a few tenths of millimeters and upwards. When these are placed the pipe parts are displaced in the direction of the gap until they bear against the abutments and hence the gap is just as wide as it should be. This is possible since the respective tube part is displaceable relative to respective second tool in the coupled position.

In a further preferred embodiment, the two tools are fixed relative to each other so that neither rotation nor axial displacement is possible, whereby also the respective tube part hereby is fixed in position for the next welding operation.

From a second aspect of the invention the object is achieved to solve the above mentioned problems to center a tube part with respect of its interior surface, but avoid a remaining interior tool after the welding operation, by a device according to the preamble of claim 5, which is characterized by that also a second tool is used. The first tool is arranged in a known manner and is possible to center relative to the internal surface of a first tube part through a number of centering means which are radially adjustable relative to the center axis of the first tool. This first tool is inserted into the open tube end of the first tube part, and is centered to the inside surface of the first tube part through the radially adjustable centering means. Then the second tool is centered relative to the first tool by the first tool comprises a first guide and the second tool comprises a second guide, which guides cooperate for centering the tools to each other. Alternatively, the guides are used together with an external tool such as a clip or a hook-like tool, which centers the first and the second tool to each other by the guides. By this arrangement, it is possible to center an external tool—the second tool—with respect to the inner surface of a tube, which is not known previously and with the advantage that the first tool can be removed before welding of the joint is to be made.

According to a preferred embodiment of the device the second tool comprises fixing means, which are arranged to fix the second tool to the outside of the first tube part. By this the second tool is fixed to the first tube part in a centered position, which position is centered in relation to the interior surface of the tube part.

In a further aspect the object is achieved by a device according to the preamble of claim 7, according to which two tube parts are centered relative to each other based on the inside of the respective tube part, and are temporarily fixed in relation to each other in the centered position. This is possible by that a first tool is arranged in a known manner and is possible to center relative to the internal surface of a first tube part through a number of centering means, which are radially adjustable relative to the center axis of the first tool. This first tool is inserted into the open tube end of the first tube part, and is centered to the inside surface of the first tube part through the radially adjustable centering means. Then a second tool is centered relative to the first tool by the first tool comprises a first guide and the second tool comprises a second guide, which guides cooperate for centering the tools to each other. Alternatively, the guides are used together with an external tool such as a clip or a hook-like tool, which centers the first and the second tool to each other by the guides. By this arrangement, it is possible to center an external tool—the second tool—with respect to the inner surface of a tube, which is not known previously and with the advantage that the first tool can be removed before welding of the joint is to be made. Further, the second tool comprises fixing means, which are arranged to fix the second tool to the outside of the first tube part. By this the second tool is fixed to the first tube part in a centered position, which position is centered in relation to the interior surface of the tube part. The device also comprises at least a third guide which is centering two equal or similar second tools relative to each other in their assembled position on respective first and second tube part end. The third guide may itself comprise several cooperative components, guiding arranged on respective second tool, or may indeed be a component which cooperates with for example the second guide which is used for centering the second tool to the first tool. Most important is that there is a third guide for centering of the both second tools to each other. The device also comprises at least one coupling member which is arranged to connect two identical or similar second tools with each other, which second tools are arranged at respective tube part end according to previous description. It is a possible option that the third guide and the coupling member is the same detail, which provides both the guiding and the coupling function. Through the device it is now possible to both center a respective tube part end relative to the interior surface of the tube part, to a respective exterior second tool and fix respective tube part end in this position, and thereafter center the respective tube part relative to another tube part and its assembled second tool.

According to a preferred embodiment of the device is the coupling member not a separate tool but instead attached to the second tool, ready to be connected with the corresponding second tool at the second tube part. In that way the both second tools can be "clicked" together smoothly during mating of the parts. As previously mentioned it is possible that the coupling member and the third guide is the same detail. Prior art outer fixtures as well as the presented solutions regarding interior centering are very time-consuming regarding connecting and to keep the tube parts in position for the continuing rigging. The continued rigging may comprise turning of the tube parts to of drawing predetermined angles of rotation relative to each other etc.

According another preferred embodiment the respective coupling member is arranged to, in the coupled position, fix the both second tools at a predetermined axial distance from each other, but still allow the both tools to be rotated in relation to each other around a common central axis. As previously mentioned, the older solutions have problems to, in a smooth and time-efficient way, ensure that the rigging is both smooth regarding the internal centering but also regarding the relative rotation between the parts, such as a bend's continued route in relation to another tube part. By the present invention it is now easy to connect the both second tools to each other and then rotate to the correct rotation angle, by that the third guide/coupling member allows this flexible fixation of the tube parts to each other.

According to a preferred embodiment is each coupling member axially adjustable or allows an adjustment of the distance between the tube part ends. This means that the both second tools are connected with the coupling member, preferably "clicked" together, on a adapted distance, wherein the tube part ends are at a sufficient distance from each other to allow spacers in the gap between the tube part ends. These spacers are selected based on the welding gap that is specified on the drawings or specified for the selected type of welding. When the spacers are arranged in the gap are then the tube parts moved in the direction of the spacers until they rest against same, by that the coupling part allows this adjustment alternative have adjustment means for this. With the device, it is thus easy to center and connect the tube parts to each other, rotating a tube, if necessary, put the right welding gap distance by, in the coupled mode, adjust the distance to the desired, something that not older solutions can handle without time-consuming setup and repeated control measurements and readjustments.

According to another preferred embodiment the device comprises at least one coupling member which is arranged to lock/definitively fix the both second tools to each other in an end position, that is, the position which is obtained by setting the correct gap distance and angle of rotation between the tube parts. Hereby, the tube parts are perfectly centered relative to each other, with minimal edge misalignment between the two tube parts inside surfaces, and in this position they are also fixed in a simple manner before the forthcoming welding operation.

According to a preferred embodiment of the device at least one of the both second tools comprises a scale, or a grading, which shows the angle of rotation between the two tools, whereby it is easy to set a given angle if needed. Older solutions are based on that the plumber measures and rotates the tube to correct angle and where the tube part in the best case is fixed at the correct angle. The difficulty to keep this angle occurs while the welding gap shall be adopted and adjusted without changing the angle between the tube parts. With the present invention this difficulty has been overcome in a simple and safe way.

A preferred embodiment of the device comprises that the second tool is divisibly arranged to, in a simple manner, be able to remove the tool from the tube part. The tool is normally removed after the fixation of the weld seam through so called nesting, which means that short parts, about 10 mm, of metal rod of the same quality as the tube part, are welded to the weld seam in some positions. When the tube parts are fixed through nesting the second tool is removed from the tube parts. The nesting residues and the metal rod residues are removed by grinding while the welding reaches the nesting positions.

By the invention a number of advantages compared to known solutions are achieved:
Centering of an externally arranged tool but the centering is based on the interior surface of the tube part.
No remaining interior tools/fixtures.
Centering and temporary fixation of tube parts in relation to each other before forthcoming welding of the tube parts to each other, where the centering is made with respect to the interior surface of the tube parts, with minimum edge misalignment between the inner surfaces at the joint location.
Simple connection of the two tube parts to each other by "clicking" together the both second tools, whereby the two tube parts gets centered relative to each other and becomes fixed at a suitable distance from each other.
In the connected position it is still possible to rotate the parts/the second tools to a desired angle of rotation relative to each other.
In the connected position the welding gap is adjustable to achieve a desired gap.
The tube parts can finally be locked in the desired end position.

SHORT DESCRIPTION OF THE FIGURES

Figure 1C:
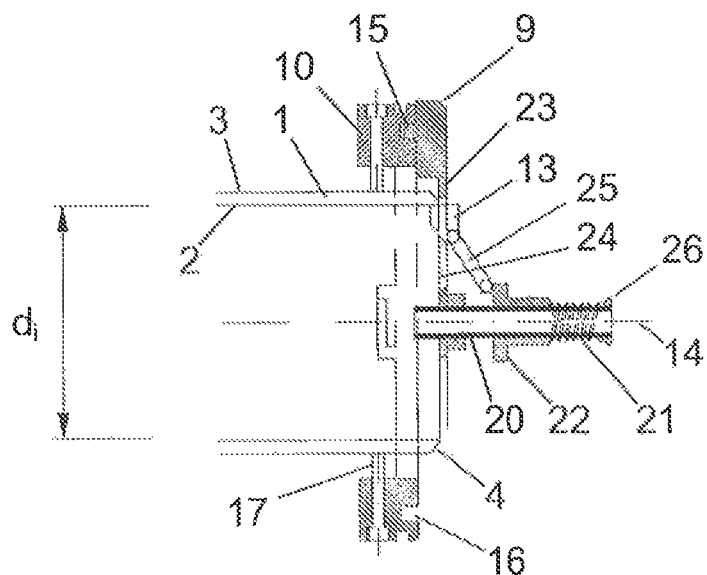
Figure 2A:
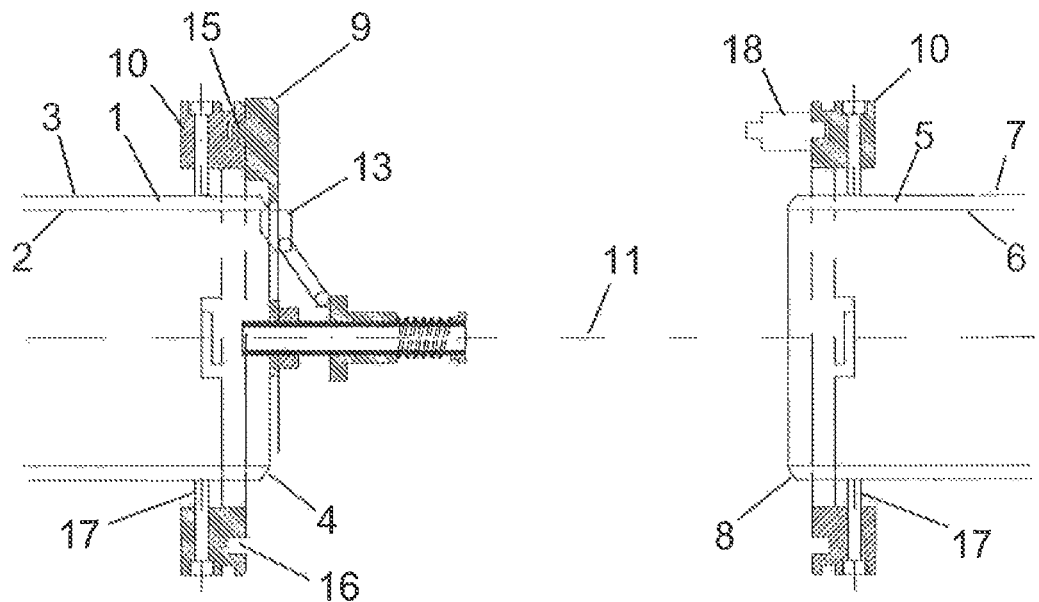
Figure 2B:
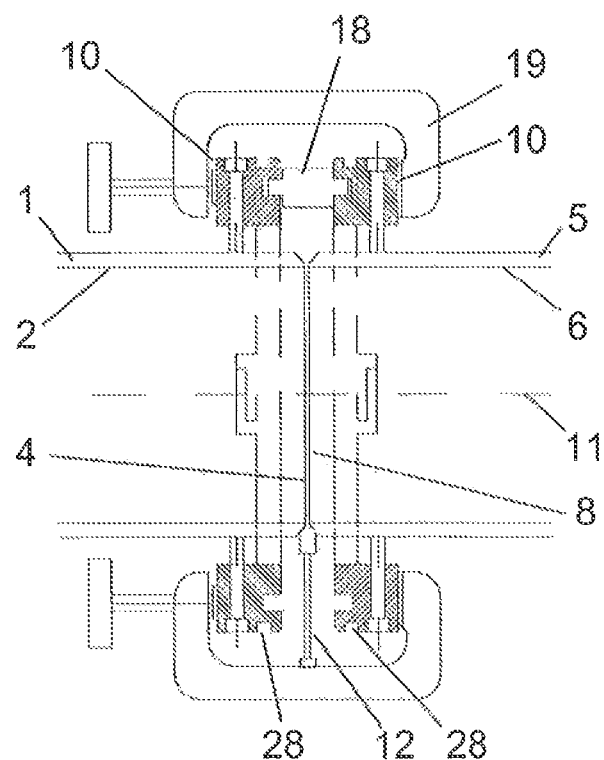

The present invention will hereinafter be explained by way of a non-limiting example with reference to the accompanying drawings, in which:
FIG. 1a shows an embodiment of the first tool.
FIG. 1b shows an embodiment of the second tool.
FIG. 1c shows the first and the second tool which are centered and fixed at a tube part end.
FIG. 2a shows two tube parts which shall be centered relative to each other.
FIG. 2b shows the two tube parts when centered in relation to their respective interior surfaces and connected.
The constructional design of the present invention are apparent in the following detailed description of an embodiment of the invention with reference to the accompanying drawings showing preferred but not limiting embodiment of the invention.

DETAILED DESCRIPTION OF THE FIGURES

FIG. 1a shows a first tool (9) which according to the preferred embodiment is designed with three arms (23), which are attached to a central cylinder (20). The respective arm (23) comprises an elongated groove (24) in the radial direction in relation to a center axis (14) of the first tool. In respective groove (24) is a centering means (13) in the form of a radially displaceable lug arranged to run. The radially centering means (13) are respectively attached to a, relative to the center axis (14) of the first tool (9), axially displaceable cylinder (22), via a respective link arm (25). Around the central cylinder (20) is also a spring (21) arranged, between the displaceable cylinder (22) and a stop lug (26), which is fixedly arranged at one 1C) end of the central cylinder (20), see also FIG. 1c. The respective arm (23) also comprises a respective first guide (15) near its outer end, in the preferred example in the form of a guide lug.

FIG. 1b shows a second tool (10) which according to the preferred embodiment is designed as a ring. The second tool (10) comprises a second guide (16) in the form of a ring-shaped groove, arranged in the tool material. Further the second tool (10) comprises a number of fixing means (17), preferably three or more, and according to the embodiment in the form of a number of screws. These are arranged to be screwed in radial direction or outwards relative a center axis (27) of the second tool (10). In the figure is also three pieces of a third guide (18) visible, which each are arranged to fit in the second guide (16), which is explained below in connection to FIG. 2a-2b. The second tool (10) preferably also comprises recesses (28) (not visible), which, where applicable, are arranged to be used in connection with connection of two identical/similar second tools (10) to each other, which is explained in FIG. 2*b*, as an alternative embodiment.

FIG. 1*c* shows the first and the second tool (9, 10) in a coupled position, on a first tube part (1). The assembly procedure is as follows. Preferably the second tool (10) is temporary hanged on the first tube part (1) to be in position for the forthcoming assembly. The first tool (9) is thereafter mounted by that the axially displaceable cylinder (22) is displaced in direction towards the first stop lug (26) whereby the spring (21) is compressed and the radially displaceable centering means (13) are displaced inwards, towards the center axis (14) of the first tool (9), by that they are running in the groove (24). Hereby the centering means (13) can be inserted in the first tube part end (4) of the first tube part (1). Preferably the first tool (9) is moved in that direction until the arms (23) abuts the first tube part end (4). Thereafter, the spring force is released or decreased by that the axially displaceable cylinder (22) is released or displaced in direction towards the first tube part end (4), whereby the centering means (13) ejects in radial direction until they abut a first interior surface (2) of the first tube part (1). Hereby the first tool (9) is centered relative to the interior surface (2). The next step is to center the second tool (10) relative to the first tool (9) and this is possible by that the first guides (15) are subsumed in the second guide (16)—according the embodiment namely the lug (15) of the first tool (9) is inserted in the groove (16) of the second tool. In this way also the second tool (10) gets centered relative to the first interior surface (2) of the first tube part (1). By the fixing means (17) the first tube part (1) is then locked to the second tool (10) in the centered position by screwing the fixing means/screws inwards towards a first exterior surface (3) of the first tube part (1).

FIG. 2*a* both shows the first tube part (1) with the second tool (10) mounted in the centered position, and also the first tool (9), still in the mounted position. Further, a second tube part (5) is shown, with a second interior surface (6), a second exterior surface (7) and a second tube part end (8). Another second tool (10) is arranged in the same way at this second tube part (5) in the manner just described (FIG. 1*c*), whereby it is centered relative to the second tube part interior surface (6). In this position the first tool (9) is removed from the tube part (1, 5) where it was last used, the same first tool (9) can of course be used at assembly of both the second tools (10)—one at a time. When the first tool (9) is removed, the previous described third guide (18) is subsumed in at least one of the both second tools (10) grooves/second guide (16). This third guide (18) can also advantageously be fixed to the second tool/tools (10). Now the both tube parts (1, 5) are moved towards each other whereby the third guide/guides (18) is/are inserted or are coordinated with the second guide (16) of the corresponding second tool (10). According to the example the third guide (18) is consisting of three free guide lugs which guides towards the groove in the opposing second tool (10). By the coordination of the guides (16, 18) the both second tools (10) are centered I relation to each other and becomes perfectly centered based on minimal edge misalignment between the interior surfaces (2, 6) of the two tube parts (1, 5), see also FIG. 2*b* and the corresponding description below.

FIG. 2*b* shows the first and the second tube part (1, 5) in their centered position relative to each other and relative to their interior surfaces (2, 6) with a common center axis (11). By the first tool (9) during assembly preferably is mounted with its arms (23) abutting the tube part end (4, 8) and then the second tool (10) is connected to the first tool (9), a determined distance between the second tool (10) and the tube part end is achieved, and then when the tube parts are brought together and by that the third guide (18) has a certain dimension, the both second tools (10) and their respective tube part end (4, 8) are positioned at a fixed distance from each other. Depending on the type of weld and on the, often drawing specified, welding gap referred to, the length dimension of the third guide (18) can be selected so that the distance between tube part ends (4, 8) becomes slightly larger than the welding gap that is present. Now, when both second tools (10) has been centered to each other, at least one but preferably more coupling members (19) are used to connect the tools (10). In the simplest form the coupling member (19) constitutes a clamp, but alternatively (not shown) it can be another form of locking device, which can hook together/connect the both second tools (10). This coupling member is preferably in the latter case arranged on at least one second tools (10). Additionally it is possible that the third guide (18) and the coupling member (19) are one and the same part, for example a clip-like hook, which both centers/controls and connects. Further, the coupling member (19) is arranged so that it connects the tools (10) so that it fixes the both second tools (10) in the axial direction, but not so firmly than to be rotatable relative to each other. Thus it is easy to turn the tube parts with the correct angle of rotation relative to each other, where this is requested, such as a tube bend which shall indicate the further route of the tube in relation to the previous pipeline construction. If another type of coupling member (19), than a clamp according to the figure, is used the second tool comprises one or more recesses (28) located so that for example a hook-like coupling member (19) or the like can be used for the axial but rotatable fixation. Once pairing is completed and the rotation likewise, the welding gap shall be adjusted exact. To achieve an exact welding gap are spacers (12) used, which spacers are located in the gap in a number of positions, whereafter the tube part ends are displaced towards the spacers (12) until they abuts the same and the correct distance is obtained. This is possible by either tightening the clamps/coupling members (19) or to the alternative design in that the coupling member (19) allows this displacement or includes means to set/affect this. When the correct welding gap is set the tube parts (1, 5) are locked to each other by the coupling member (19) and the welding operation can begin because the rigging is complete. The second tools (10) are obviously divisible to be removed from the tube parts, which preferably takes place after the pads been nested together.

PARTS LIST

1=first tube part
2=first interior surface
3=first exterior surface
4=first tube part end
5=second tube part
6=second interior surface
7=second exterior surface
8=second tube part end
9=first tool
10=second tool
11=common center axis
12=spacer
13=centering means
14=center axis (first tool)
15=first guide
16=second guide
17=fixing means 18=third guide
19=coupling member
20=central cylinder
21=spring
22=axial displaceable cylinder
23=arm
24=groove
25=link arm
26=stop lug
27=center axis (second tool)
28=recess
$d_i$=inside diameter

The invention claimed is:

1. A method for centering and temporary fixation of first and second tube parts relative to each other before a joint welding operation of the first and second tube parts to one another, where the first tube part (1) comprises a first interior surface (2), a first exterior surface (3) and a first tube part end (4), and the second tube part (5) comprises a second interior surface (6), a second exterior surface (7) and a second tube part end (8), the method comprising:
 a. centering a first tool (9) relative to the interior surface (2) of the first tube part (1),
 b. centering a second too, for the first tube part, (10) with respect to the first tool (9),
 c. fixing the exterior surface of the first tube part (1) to the second tool, for the first tube part, (10), whereby said first tube part (1) thereby is fixed and centered relative to the second tool, for the first tube part, (10),
 d. removing the first tool (9) from the first tube part (1),
 e. centering the first tool (9) relative to the interior surface (2) of the second tube part (5),
 f. centering a second tool, for the second tube part, (10) with respect to the first tool (9),
 g. fixing the exterior surface (3) of the second tube part (5) to the second tool, for the second tube part, (10), whereby the second tube part (5) thereby is fixed and centered relative to the second tool, for the second tube part, (10),
 h. removing the first tool (9) from the second tube part, and
 i. centering both the second tools (10), for the first and second tube parts (1, 5), relative to each other by at least one third guide (18) whereby the first and the second tube parts (1, 5) will be centered relative to each other with respect to the interior surfaces (2, 6), and further fixed with a predetermined distance between respective first and second tube part ends (4, 8).

2. The method according to claim 1, further comprising rotating the first and second tube parts (1, 5), in their centered and connected position, to a desired rotation angle relative to each other, around a common center axis (11) in the connected position.

3. The method according to claim 1, further comprising placing at least one spacer (12) of a predetermined thickness between the first and second tube part ends (4, 8) whereafter the first and second tube parts (1, 5) are displaced towards the spacer/spacers (12) until the first and second tube part ends (4, 8) abuts said at least one spacer and thereby a desired distance between the first and second tube part ends (4, 8) is achieved.

4. The method according to claim 1, further comprising fixing both second tools, for the first and the second tube parts, (10) relative to one another in a desired position.

5. A device for centering a tube part before a joint welding operation of first and second tube parts to one another, where the first tube part (1) comprises a first interior surface (2), a first exterior surface (3) and a first tube part end (4), and
 the device comprises a first tool (9) which is arranged to be centered relative to the interior surface (2) of the first tube and comprises centering means (13) which is radially adjustable relative to a center axis (14) of the first tool, and the centering means (13) of the first tool (9) is insertable in the first tube part (1),
 wherein a second toot, for the first tube part, (10) is arranged to be centered relative to the first tool (9), the first tool (9) comprises at least one first guide (15) and the second tool, for the first tube part, (10) comprises at least one second guide (16), and the first and the second guides (15, 16) cooperates with one another for centering of the first tool and the second tool, for the first tube part, (9, 10) relative to one another;
 the second tool, for the first tube part, (10) further comprises fixing means (17), which are arranged to fix the exterior surface (3, 7) of the second tube part (1, 5) to the second tool (10), adjacent a second tube part end;
 a second tool, for the second tube part, (10) is arranged to be centered relative to the second tube part (1, 5), and the second tool, for the second tube part, (10) comprises fixing means (17) which are arranged to fix the exterior surface (3, 7) of the second tube part (1, 5) to the second tool for the second tube part, (10); and
 the device comprises at least one third guide (18) which centers the second tool, for the first tube part, (10) and the second tool, for the second tube part, (10), relative to one another, in their mounted position on the respective first and second tube part ends (4, 8).

6. A device for centering and temporary fixation of first and second tube parts in relation to each other before a joint welding operation of the first and the second tube parts to one another, where
 the first tube part (1) comprises a first interior surface (2), a first exterior surface (3) and a first tube part end (4),
 the second tube part (5) comprises a second interior surface (6), a second exterior surface (7) and a second tube part end (8), and
 the device comprises:
 a first tool (9) which is arranged to be centered relative to the first tube part interior surface (2, 6) by centering means (13), the centering means (13) is radially adjustable relative to a center axis (14) of the first tool, and the centering means (13) of the first tool (9) is insertable in the first tube part (1, 5),
 wherein a second tool, for the first tube part, (10) is arranged to be centered relative to the first tool (9), the first tool (9) comprises at least one first guide (15) and the second tool, for the tube part, (10) comprises at least one second guide (16), and the first and the second guides (15, 16) cooperate with one another for centering of the first tool and the second tool, for the first tube part, (9, 10) relative to one another, and the second tool, for the first tube part, (10) further comprises fixing means (17), which are arranged to fix the exterior surface (3, 7) of the second tube part (1, 5) to the second tool, for the first tube part, (10),
 a second tool, for the second tube part, (10) is arranged to be centered relative to the second tube part (1, 5), and the second tool, for the second tube part, (10) comprises fixing means (17) which are arranged to fix the exterior surface (3, 7) of the second tube part (1, 5) to the second tool, for the second tube part, (10), and
 the device comprises at least one third guide (18) which centers the second tool, for the first tube part, and the second tool, for the second tube part, (10) relative to one another in their mounted position on the respective first and second tube part ends (4, 8), and at least one coupling member (19) is arranged to connect the the second tool, for the first tube part, and the second tool, for the second tube part, (10) with one another when the second tool, for the first tube part, and the second tool, for the second tube part, (10) are arranged on the respective first and second tube part ends (4, 8).

7. The device according to claim 6, wherein the at least one coupling member (19) is arranged to connect the second tool, for the first tube part, (10), arranged at the first tube part end (4), with the second tool, for the second tube part, (10), arranged at the second tube part end (8).

8. The device according to claim 6, wherein each at least one coupling member (19) is arranged to, in the connected position, fix the second tools, for the first and the second tube, (10) in a predetermined, axial distance relative to one another, but, at the same time, allow both of the second tools, for the first and the second tube parts, (10) to be rotated relative to one another around a common center axis (11).

9. The device according to claim 6, wherein each at least one coupling member (19), in the connected position, is adjustable regarding an axial distance between the second tools, for the first and the second tube parts, (10), and the distance between respective first and second tube part ends (4, 8) is adjustable.

10. The device according to claim 5, wherein the at least one coupling member (19) is arranged to lock the second tools, for the first and the second tube parts, (10) to one another in an end position, after adjustment of the distance between the tube parts ends (4, 8) and their mutual rotation relative to one another.

11. The device according to claim 6, wherein at least one of the second tools, for the first and the second tube parts, (10) comprises a scale which shows a rotational angle between the second tools, for the first and the second tube parts, (10).

12. The device according to claim 6, wherein the second tool, for the first and the second tube parts, (10) is divisible.

* * * * *